United States Patent Office 3,399,997
Patented Sept. 3, 1968

3,399,997
PROCESS OF PRODUCING SOY MILK
FROM SPROUTED SOYBEANS
George K. Okumura, 3151 S. Elm Ave. 93706, and Jack E. Wilkinson, 2411 Divisadero 93721, both of Fresno, Calif.
No Drawing. Filed Apr. 5, 1965, Ser. No. 445,695
15 Claims. (Cl. 99—64)

ABSTRACT OF THE DISCLOSURE

Process of producing soy-base milk wherein soybeans are moistened and sprouted to diminish the soy taste, ground into a slurry while retaining moisture previously absorbed; extracting therefrom a liquor comprising a suspension of fine solids, treating said liquor to precipitate the fine solids therefrom in the form of a curd; comminuting said curd and mixing it with fresh water to develop a milk suspension, followed by the addition of additives to simulate natural milk; and then homogenizing.

---

This invention relates to the processing of soy milk and has as its general object to provide an improved process of extracting the useful content of soybeans and formulating it into soy milk.

An important object of the invention is to eliminate the characteristic soybean flavor and to provide a milk having a relatively bland taste. A further object of the invention is to provide a process wherein the disagreeable characteristics of soybean taste are eliminated before the beans are ground into a slurry.

A further object is to produce a soy milk which is easily digestible.

In general, our improved process is one wherein selected soybeans are first subjected either to a sprouting step or to a prolonged soaking step in which the hulls are loosened and the beans are softened; wherein the softened beans are subsequently reduced, by grinding, to a slurry which is then diluted by the addition of water; and wherein the milk is then extracted from the diluted slurry and finally treated by mixing additives therewith.

Other objects of the invention will become apparent in the ensuing specification, wherein my improved process, in several alternative forms thereof, is described in the following examples:

Example I

According to our preferred process, selected soybeans, after being first cleaned, are moistened and sprouted at a temperature of 90° F.–100° F. over a time period of approximately 3 days, to produce sprouts approximately ½ to 1½ inches in length. The sprouting step is carried out by spreading the beans upon a screen or sheet of porous fabric in a layer of several beans depth. This layer of beans is sprinkled from above by a water spray at intervals of between 2 and 3 hours to maintain the beans adequately moist. In the spray, we avoid the use of water at a temperature much colder than the aforesaid sprouting temperature, so as to avoid arresting the sprouting action.

The sprouting step improves the vitamin content of the beans and also results in the hulls being loosened to a considerable extent, thereby facilitating the subsequent removal of the hulls. A very substantial percentage of the hulls will drop off the beans during the sprouting step and the ensuing transfer of the beans to the next processing area. The sprouting step also modifies the taste of the beans so as to largely eliminate the disagreeable aspect of soybean flavor.

Subsequent to the sprouting step, the beans, while still in a softened, moistened condition, with substantially as much water content as at the end of the sprouting step, are transferred to a stone grinder in which they are ground into a slurry or mash. They are reduced by the grinding, to particles varying in size from colloidal dimension up to discrete particles. After the stone grinding is completed, water is added in sufficient quantity to bring the total water content up to approximately 8 times the dry bean content, by weight. Water is added to the resulting slurry until it attains a substantially liquid state, with all of the bean solids in suspension, the slurry being subjected to some agitation to maintain the suspension.

The diluted slurry is then cooked in a pressure cooker or in an open vat, using steam as the heating medium, the live steam being injected directly into the slurry, in both cases. In the pressure cooker, cooking is continued from 5 to 7 minutes. In the open vat cooking, it is continued for about 20 minutes. Cooking temperature in the pressure cooker is approximately 250° F. In the open vat cooker it is approximately 215° F.

Following the cooking step, the cooked slurry is treated to separate the liquid and suspended fine solids from the pulp (remaining solids of the ground beans).

The suspension liquor is extracted from the cooked diluted slurry by a suitable extraction process (e.g. by straining it through a fabric bag strainer with the application of pressure to abstract as much of the liquid as possible); or by centrifuging.

To the extracted suspension liquor is then added a mixture of calcium sulphate and magnesium chloride, as a precipitant, and the milk is stirred very gently until the solids of the liquor are precipitated in the form of a curd at the bottom of the container. The precipitated curd is then washed, before it is removed from the precipitating container, by first removing as much as possible of the body of excess liquid standing above the precipitated curd without disturbing the curd; and then filling the container with fresh water which functions to dissolve and wash away the excess precipitant chemical that has not been chemically combined with the protein. We find that the percentage of the chemicals that is actually absorbed is far below the percentage that could be harmful to the person eating the product. The rinse water that has been added is stirred gently for a few minutes. A wire mesh basket is then inserted into the container on top of the curd to contain it while the excess water is removed from the space within the basket (e.g. by pumping, siphoning or dipping). More water is then removed by pressure extraction in a mold lined with a fine fabric cloth liner in full-bag form, having outlet openings in the bottom for release of water and having as a cover or top, a movable pressure plate or piston which is moved slowly downwardly, exerting a gentle pressure of about 8 ounces per square inch (e.g. 100 pounds for a pressure plate of 200 square inches area) against the bag, the pressure being applied by a dead weight and over a period of about 15–30 minutes, until the drainage of excess liquid substantially stops.

The residue bean curd, after extraction of water, is then comminuted to a very fine state. This can be done by grinding, though preferably by treatment in an emulsifying machine or colloid mill in which extremely finely divided state is attained. The milk is then formulated by the addition of ingredients for adjusting the milk to resemble as nearly as possible, natural cow's milk, or other natural milk which it may be desirable to simulate. For simulating whole cow's milk, the additives are oil (e.g. cotton seed, peanut, corn or other equivalent oil) sugar, salt, calcium gluconate and ferrous sulphate. To produce a fortified milk, vitamins A, D and C are added, in addition to the additives mentioned above. The formulating step is preferably performed immediately following the separation step, to minimize bacterial contamination and growth in the milk. Where the emulsification step is employed, additives such as syrup, sugar, oil, calcium gluconate, vitamins such as vitamin A, vitamin D and vitamin C; and ferrous sulphate and optionally, stone ground cashew nuts, are added into the mixture before the emulsification treatment.

The emulsified product is then pasteurized, using a standard milk pasteurizing process, in order to eliminate bacterial contamination acquired during the preceding processing steps.

Following the formulation step, the milk is homogenized at a pressure of 3,000 pounds per square inch to preserve the suspension of the oil in the milk and prevent separation. A conventional milk homogenizer can be used in carrying out this step.

The homogenized milk is then cooled to about 40° F., and is then packaged. For fresh milk, it is packaged in conventional fresh milk containers, and then refrigerated for transportation to market.

Where the milk is canned, the pasteurization and cooling steps are eliminated and the homogenized milk is directly packaged into sealed cans, the cans of milk then being pressure-cooked for approximately 30 minutes in lieu of pasteurization.

Example II

Where it is desirable to shorten the processing time and to reduce the expense attendant upon the sprouting step, and where the improved vitamin content which is realized through the sprouting step can be dispensed with, the beans, after selection and cleaning, are subjected to an initial step of soaking them in a vat of water maintained at room temperature for a period of 8 hours to 12 hours. This soaking step will result in softening and loosening of hulls, though to a somewhat lesser extent than in the sprouting step of the preferred process.

Following the soaking step, the beans are subjected to the further processing following the sprouting step as described in Example I above.

Example III

The preferred process of Example I is utilized as to all steps thereof up to and including the homogenization step. The milk is then sealed in cans and is subsequently subjected to further pressure cooking.

Example IV

The soybeans are first treated by the sprouting step described in Example I above.

At the end of the sprouting step, the sprouted beans are transferred to a sodium hydroxide bath in which they are soaked for a period of approximately 4 hours. Hulls still clinging to the beans are further loosened in the hydroxide bath and will be removed in the ensuing washing steps. The hydroxide bath also functions to remove the remaining disagreeable aspects of the soybean flavor, so that such flavor is not imparted to the slurry and the extract subsequently developed from the sprouted, soaked beans.

Following the hydroxide treatment, and without any substantial delay such as would tend to reduce the moisture content, the beans are subjected to successive washing operations in successive baths of clear water, to remove the residual hydroxide from the beans and to remove hulls. In each washing bath, the beans are agitated to expedite the elimination of hydroxide and the removal of hulls. Agitation may be effected by tumbling in a rotating barrel or other container; or by hydrostatic means such as pressurized water jets directly upwardly through the beans within the washing bath container (e.g. by recirculating the water through a high pressure pump). During the washing stage, the hulls which remain associated with the beans are floated off through discharge from the washing container slightly below the surface of the bath therein. This can be accomplished by the aforesaid recirculation of water, with the discharging stream, laden with hulls, being passed through a filter or other means for separating the hulls from the recirculating stream. The level of discharge of the recirculating stream which carries away the hulls is preferably immediately below the level of the bath within the container. At the end of each washing step, the bath water is drained off to waste through a bottom outlet in the container. The washing step is repeated at least twice for a total of three washings, or more.

The beans are then subjected to a weak acid bath to neutralize the hydroxide residual in the beans. A weak hydrochloric acid solution is preferred, although other non-toxic acids, such as citric acid, can be utilized. The beans are soaked in the weak acid bath for approximately two hours so as to dissolve out and neutralize the residual hydroxide. There is further loosening and removal, in this acid bath, of any residual hulls not removed in the preceding treatment. Such hulls are floated away in the draining off of the acid bath at the end of the acid treatment, and in the further washing steps.

Following the neutralization step, the beans are subjected to further washing in two or more clear water baths to dissolve away and remove any acid that is residual in the beans. To a small extent, additional residual hull removal will take place in these washings.

The final washing liquor (e.g. of the second bath of the acid removal series) is then tested for neutrality. If it is acid below a pH reading of 7, the beans will be subjected to one or more further washing steps, with additional pH testings of the liquor at the end of each such further washing, until the residual liquor at the end of the last washing shows a reading of at least 7.

If the last pH test shows a reading of above 7.5, a very weak acid (hydrochloric or citric acid) is added to the washing liquor just sufficiently to bring the pH reading back to 7. Where it is necessary to utilize this correction step, the beans are left in the neutralized liquor for a period of time sufficient for the neutrality of the liquor to be transmitted to the beans.

Promptly after removal from the last washing bath, and without permitting the beans to lose moisture, they are transferred to a stone grinder, in which they are reduced to a slurry as hereinbefore described in Example I. The subsequent steps of Example I are then performed, beginning with the dilution of the slurry, followed by extraction of a curd, etc., all as described above.

We claim:

1. A process for the production of soy milk comprising the following steps: sprouting and moistening soybeans, whereby the unpleasant soybean flavor is substantially diminished; subsequently grinding the beans while retaining previously absorbed moisture, to produce a slurry; subsequently extracting from the slurry a liquor comprising a suspension of the fine solids of said slurry in water; then treating said suspension liquor to precipitate said fine solids in the form of a curd; then comminuting said curd; then adding fresh water to the comminuted curd to develop a milk suspension; then mixing with said milk suspension, selected additives including oil so as to formulate a milk simulating natural milk; and then homogenizing the formulated milk.

2. The process defined in claim 1, wherein the curd is comminuted to finely divided loose particles of a size extending into the colloidal range.

3. The process defined in claim 1, wherein the curd is chemically precipitated by addition of calcium sulphate and magnesium chloride to the extracted suspension liquor.

4. The process defined in claim 1, wherein the slurry is diluted by the addition of water in a ratio up to 8 times the dry bean content of the slurry, before the extraction of the suspension liquor.

5. A process for the production of soy milk comprising the following steps: subjecting soybeans first to prolonged exposure to atmosphere and moisture until the beans are sprouted, whereby the unpleasant soybean flavor is substantially diminished; subsequently grinding the beans while retaining previously absorbed moisture, to produce a slurry; then extracting from said slurry a liquor comprising a suspension of the fine solids of said slurry in water; then treating said liquor to precipitate said fine solids; then extracting said fine solids from said liquor; then adding fresh water to said fine solids to develop therefrom a milk suspension of said fine extracted solids in water; subsequently mixing with said milk suspension, selected additives including oil so as to formulate a milk simulating natural milk; and then homogenizing the formulated milk.

6. The process defined in claim 5, wherein, in said sprouting step the beans are supported in a layer of a few beans depth upon a moisture-pervious supporting surface, fully exposed to atmosphere, and are intermittently subjected to a water spray at a temperature of 90°–100° F.

7. A process for the production of soy milk, comprising the following steps: subjecting soybeans to prolonged exposure to moisture to soften them, to effect sprouting thereof, and to loosen their hulls; grinding the beans while retaining the moisture absorbed in the previous steps, to produce a slurry, extracting from the slurry a liquor containing in suspension the fine solids of the slurry; then treating said liquor to pricipitate said fine solids; then extracting said fine solids from said liquor; and then adding fresh water and additive ingredients to the extracted solids to formulate a milk suspension.

8. The process defined in claim 7, including the steps of diluting the slurry with water to a substantially liquid state, following the grinding step; and then cooking said diluted slurry before extraction of said fine solids.

9. The process defined in claim 7, wherein, in said softening step said beans are simultaneously subjected to atmospheric contact and to moisture until they are sprouted.

10. The process defined in claim 7, including the additional steps of subjecting the softened beans to an alkaline bath to improve the flavor; then subjecting the beans to a weak acid bath to neutralize the alkalinity acquired in the alkaline bath.

11. The process defined in claim 10, wherein said alkaline bath is a solution of sodium hydroxide.

12. The process in claim 10, wherein said acid bath consists of a weak hydrochloric acid.

13. The method defined in claim 7, wherein the formulation of the milk includes the addition of sugar, salt, calcium gluconate, ferrous sulphate and an oil selected from the group including cotton seed oil, peanut oil and corn oil.

14. The method defined in claim 7, including the further step of sealing the formulated milk in cans and pressure cooking it for approximately 30 minutes thereafter.

15. A method of producing soy milk comprising the following steps: subjecting selected cleaned soybeans simultaneously to atmosphere and moisture at a temperature in the range of approximately 90°–100° F. over a period of approximately three days time, to produce sprouts of a length in the range of ½ to 1½ inches, thereby at least partially loosening the hulls; then grinding the beans without substantial loss of moisture to produce a slurry, and adding water in approximately an 8:1 ratio to dilute said slurry into a substantially liquid state with the bean solids in suspension therein; then high pressure cooking the slurry for a short time; subsequently removing large particles from the slurry by straining the slurry, leaving the fine solids therein; then treating the strained slurry to precipitate said fine solids in the form of a curd; then comminuting said curd; then adding fresh water to the comminuted curd to develop a milk suspension; then formulating said milk suspension into a satisfactory milk by mixing selected additives therewith; and then homogenizing the formulated milk.

References Cited

UNITED STATES PATENTS

| 2,712,539 | 7/1955 | Nugent et al. | 260—123.5 |
| 2,881,159 | 4/1959 | Circle et al. | 99—98 X |

OTHER REFERENCES

Loska et al., Reprint from Cereal Chemistry, vol. 27, No. 2, March 1950, pp. 127–129.

Smith et al., Reprint from Food Technology, vol. XIV, No. 7, 1960, pp. 1–5.

U.S. Department of Agriculture Publication No. CA–N–13, January 1961, S 584.05 A4 No. 13 C.2.

RAYMOND N. JONES, *Primray Examiner.*

S. E. HEYMAN, *Assistant Examiner.*